United States Patent [19]

Gugel et al.

[11] Patent Number: 5,288,672
[45] Date of Patent: Feb. 22, 1994

[54] CERAMICS BASED ON ALUMINUM TITANATE, PROCESS FOR THEIR PRODUCTION AND THEIR USE

[75] Inventors: Ernst Gugel, Roedental; Bernhard Freudenberg, Coburg; Johannes Seyer, Roedental-Mittelberg, all of Fed. Rep. of Germany

[73] Assignee: Bayer Aktiensesellschaft, Leverkusen, Fed. Rep. of Germany

[21] Appl. No.: 899,008

[22] Filed: Jun. 15, 1992

Related U.S. Application Data

[63] Continuation-in-part of Ser. No. 336,826, Apr. 12, 1989, abandoned.

Foreign Application Priority Data

Apr. 26, 1988 [DE] Fed. Rep. of Germany ....... 3814079

[51] Int. Cl.$^5$ ............................................. C04B 35/46
[52] U.S. Cl. ..................................................... 501/134
[58] Field of Search ................. 501/127, 134, 153, 80, 501/81, 84

[56] References Cited

U.S. PATENT DOCUMENTS

| | | | |
|---|---|---|---|
| 2,776,896 | 1/1957 | Harman et al. | 501/134 |
| 3,568,723 | 3/1971 | Sowards | 60/272 |
| 4,118,240 | 0/1978 | Takabatake et al. | 501/134 |
| 4,277,539 | 0/1981 | Keller et al. | 501/20 |
| 4,316,965 | 2/1982 | Oda et al. | 501/128 |
| 4,483,944 | 11/1984 | Day et al. | 502/439 |
| 4,767,731 | 8/1988 | Asami et al. | 501/136 |

FOREIGN PATENT DOCUMENTS

| | | |
|---|---|---|
| 0037868 | 10/1981 | European Pat. Off. . |
| 0133021 | 2/1985 | European Pat. Off. . |
| 0210813 | 2/1987 | European Pat. Off. . |
| 339379 | 11/1989 | European Pat. Off. . |
| 2750290 | 5/1979 | Fed. Rep. of Germany ...... 501/134 |
| 2741434 | 10/1987 | Fed. Rep. of Germany . |
| 3644664 | 7/1988 | Fed. Rep. of Germany .......... 35/46 |
| 3707396 | 9/1988 | Fed. Rep. of Germany .......... 35/46 |
| 3814079 | 11/1989 | Fed. Rep. of Germany . |
| 2408557 | 7/1979 | France . |
| 01305854 | 12/1989 | Japan . |

OTHER PUBLICATIONS

The Parent Application Ser. No. 07/336,826.

*Primary Examiner*—Karl Group
*Assistant Examiner*—A. Wright

[57] ABSTRACT

Ceramics having principal phases of aluminum iron titanate and mullite corresponding to the overall chemical composition:

50 to 62% by weight $Al_2O_3$,
36 to 49.5% by weight titanium oxide, expressed as $TiO_2$,
0.5 to 10% by weight $SiO_2$, and
0.2 to 15% by weight iron oxide, expressed as $Fe_2O_3$,
up to 1% by weight impurities,
   with the sum of $Al_2O_3$, $TiO_2$ and $SiO_2$ being 100%, wherein the sum of the crystalline phases $Al_2O_3$, $TiO_2$, $SiO_2$ (other than the principal phases) is less than 6% by weight, based on the sintered body, are useful where a ceramic having a high thermal-shock-resistance is required, such as exhaust port liner internal combustion engines, for example.

16 Claims, No Drawings

CERAMICS BASED ON ALUMINUM TITANATE, PROCESS FOR THEIR PRODUCTION AND THEIR USE

This application is a continuation-in-part, of application Ser. No. 07/336,826 filed Apr. 12, 1989 now abandoned.

This invention relates to sintered ceramics based on principal phases of aluminum iron titanate and mullite for the following chemical composition 50 to 62% by weight $Al_2O_3$,
36 to 49.5% by weight titanium oxide, expressed as $TiO_2$,
0.5 to 10% by weight $SiO_2$, the sum of these three components being 100%, and in addition from 0.2 to 15% by weight iron oxide, expressed as $Fe_2O_3$, and up to 1% by weight impurities, to processes for the production of these sintered ceramics and to their use.

BACKGROUND OF THE INVENTION

There is a need in practice for thermal-shock-resistant materials which are suitable for use at temperatures of $\geq 1000°$ C. and which, at the same time, have a strength level of $\geq 40$ MPa which provides for engineering constructions, such as: in melt metallurgy, for example, for throughflow controllers, in machine construction, for example hot gas fans, in engine construction, for example thermal insulations of the exhaust gas port (port liners), in chemical engineering, for example as filters or catalyst supports.

Although ceramics based on pure aluminum titanate, or tialite, show interesting properties, such as a low thermal expansion coefficient (TEC) and a low Young's modulus, they are of only limited technological value on account of their very poor strength and their tendency to decompose at temperatures in the range from about 900° to about 1300° C. At temperatures in this range, tialite decomposes into the starting oxides $Al_2O_3$ and $TiO_2$, accompanied by a marked increase in the TEC.

Numerous proposals have been made for the production of ceramics based on aluminum titanate. Thus, U.S. Pat. No. 2,776,896 relates to a non-decomposing, thermal-shock-resistant aluminum titanate ceramic of which the improved properties are achieved by additions of iron, magnesium and silicon.

According to U.S. Pat. No. 2,776,896, the addition of 1 to 2 mol-% $Fe_2TiO_5$ to $Al_2TiO_5$ is sufficient to produce substantial resistance to decomposition and up to 50 mol-% $Fe_2TiO_5$ may be added without the low TEC being significantly affected. For a ceramic of 90 mol-% $Al_2TiO_5$ and 10 mol-% $Fe_2TiO_5$, a TEC (RT−400° C.) of $-2.35 \times 10^{-6}$ 1/K is measured after sintering.

In addition to iron, silica may be added to the composition. If silicon dioxide is added, it should be added in the form of clay for practical reasons. The silica content of the mass should not exceed 10% by weight. The formula is preferably calculated in such a way that one additional mol $TiO_2$ is added for 2 mol $SiO_2$ (column 7, line 21). This means an excess of free $TiO_2$ which results in inadequate strength. Thus, all the Examples disclosed show relatively high contents of free oxidic components.

EP-B 133 021 describes an aluminum titanate/mullite ceramic consisting of 60 to 75% by weight $Al_2O_3$, 15 to 35% by weight $TiO_2$ and 1 to 16.5% by weight $SiO_2$. In another embodiment, 0.5 to 5% by weight $Fe_2O_3$ and/or 0.5 to 5% by weight rare earth oxides are also added. The quoted Examples described compositions of the sintered ceramic comprise mullite contents of 20 to 40% by weight, $Al_2TiO_5$ contents of 50 to 70% by weight and $Al_2O_3$ contents of 10 to 12% by weight. In addition, oxides of iron, lanthanum and neodymium are added. Adequate strength values of >40 MPa are only obtained at sintering temperatures of or above 1500° C. and by addition of expensive rare earth oxides.

EP-A 210 813 describes an aluminum titanate/mullite ceramic, in the production of which at least one of the two components aluminum titanate or mullite is presynthesized and then sintered at temperatures in the range from 1500° to 1700° C. The overall composition is 53–74% by weight $Al_2O_3$, 14–33% by weight $TiO_2$, 6–20% by weight $SiO_2$ and 1.2–5% by weight $Fe_2O_3$. Due to the necessary presynthesis, this process is relatively expensive. In addition, the ceramics produced by this process show inadequate strength values.

De-PS 2 741 434 describes an aluminum titanate ceramic which, in addition to 2 to 13% by weight $SiO_2$, contains 0.5 to 10% by weight rare earth oxides and 1.5 to 20% by weight of $SnO_2$. This ceramic shows inadequate strength values.

According to DD-B 29 794, high thermal-shock-resistance is produced by a very low, preferably negative, linear thermal expansion coefficient. For the production of a highly refractory oxidic material showing high thermal-shock-resistance, this publication proposes compositions of $MgO$-$Al_2O_3$-$TiO_2$ or of $MgO$-$Al_2O_3$-$TiO_2$-$SiO_2$, the $TiO_2$ content being said to amount to between 15 and 75% by weight, the $Al_2O_3$ content to between 70 and 25% by weight and the contents of $SiO_2$ and $MgO$ up to 40 and 20%, respectively. The obtainable coefficient of linear thermal expansion is said to be $<4 \times 10^{-6}$ 1/K in the range from 10° to 700° C., preferably being negative or differing only slightly from zero. The mixing ratios of $Al_2O_3$ to $TiO_2$ shown in the Examples encompass the broad range from 1:0.7 to 1:1.7, the latter range applying to a silicate-free composition containing 8% by weight $MgO$.

Corresponding materials are of little value on account of their poor strength.

The safe use of the ceramic in practice presupposes a number of properties which the material is required to show in a reproducible form. For many applications, as for example in melt metallurgy, thermal-shock-resistance is an important criterion. Not only a low TEC, but also a low Young's modulus and high strength are crucially important to thermal-shock-resistance. The shrink in behavior of the ceramic is another crucial property in cases where a metal jacket is to be cast around a ceramic tube insert, as for example the exhaust port liners in cylinder heads. The ceramic has to yield to the solidifying and shrinking metal sleeve without breaking. This requires a ceramic material showing high fracture strain in combination with small shrinkage backstresses, i.e. a low Young's modulus and high strength. In addition, the use of the ceramic, for example as a hot gas fan, requires excellent decomposition resistance above 900° C.

BRIEF DESCRIPTION OF THE INVENTION

Ceramics according to the present invention have principal phases of aluminum iron titanate and mullite, and have an overall chemical composition:

50 to 62% by weight $Al_2O_3$, 36 to 49.5% by weight titanium oxide, expressed as $TiO_2$, 0.5 to 10% by weight $SiO_2$, and 0.2 to 15% by weight iron oxide, expressed as $Fe_2O_3$ up to 1% by weight impurities, with the sum of $Al_2O_3$, $TiO_2$ and $SiO_2$ being 100% wherein the sum of the crystalline phases $Al_2O_3$, $TiO_2$, $SiO_2$ (other than the principal phases) is less than 6% by weight, based on the sintered body.

DETAILED DESCRIPTION

The object of the present invention is to provide materials which exhibit these properties. In addition, the material is intended to be obtainable by a simple, inexpensive process, for example by reaction sintering.

The reaction sintering of the raw materials containing Al, Ti, Si, Fe, etc. has the advantage over the use of presynthesized products, such as for example $Al_2TiO_5$ clinker, that it is possible to use raw materials which are commercially available relatively inexpensively and in large quantities with readily reproducible properties. For economic reasons, reaction sintering should be carried out at the lowest practicable temperatures, for example at temperatures below 1500° C. Economic considerations also rule out expensive additives, such as rare earth oxides.

Despite the wide variety of patent literature and other publications on materials based on aluminum titanate, it has so far not been possible to produce a satisfactory material showing this combination of properties by the inexpensive method of reaction sintering.

The material according to the invention described in the following, produced by careful choice of the composition and accurately adapted processing, particularly during sintering, satisfies all the technical and economic requirements listed in the foregoing.

The present invention relates to sintered ceramics based on principal phases of aluminum iron titanate and mullite for the following chemical overall composition:

50 to 62% by weight $Al_2O_3$ 36 to 49.5% by weight titanium oxide, expressed as $TiO_2$, 0.5 to 10% by weight $SiO_2$, and preferably between 1 to 5.5%, the sum of these three components being 100%, and in addition from 0.2 to 15% by weight iron oxide, expressed as $Fe_2O_3$, and up to 1% by weight impurities, comprising at most 0.3% by weight MgO and at most 0.7% by weight of $K_2O+P_2O_5$, characterized in that the sum of the crystalline phases $Al_2O_3$, $TiO_2$, $SiO_2$ present in addition to the principal phases is less than 6% by weight, based on the sintered body.

In its sintered state, the material according to the invention consists essentially of two crystalline phases, namely: an $Al_2TiO_5$-$Fe_2TiO_5$ solid solution and the mullite phase which is taken as $3Al_2O_3.2SiO_2$.

Particularly preferred sintered ceramics are those in which the sum of the crystalline phases $Al_2O_3$, $TiO_2$ and $SiO_2$ present in addition to the principal phases is less than 4% by weight, based on the sintered body.

The presence of iron, for example in the form of finely dispersed $Fe_2O_3$, has a favorable, very complex effect on microstructure and on resistance to decomposition. Particularly preferred sintered ceramics according to the invention have a content of iron oxide, expressed as $Fe_2O_3$, of from 0.4 to 5% by weight.

The formation of aluminum titanate—from pure $Al_2O_3$ and $TiO_2$ in the case of reaction sintering—does not take place spontaneously at temperatures in the range from ~1280° to ~1350° C., but requires a nucleating agent to form grains of tialite. Iron, for example in the form of finely dispersed $Fe_2O_3$ with a mean particle size of less than 1 μm, has proved to be an effective nucleating agent for tialite.

The sintered ceramics according to the invention are distinguished by a combination of particularly good physical properties. Thus, their flexural strength at room temperature is in the range from 40 to 150 MPa, their Young's modulus is in the range from 5 to 20 GPa and their TEC (RT −1000° C.) is in the range of $\pm 2 \times 10^{-6}$ 1/K. Even after more than 100 hours at 1000° C., they are still resistant to decomposition.

Another advantage and characteristic feature of ceramics according to the invention is the fact that they can be sintered at relatively low temperatures with short holding times. These ceramics are sintered at temperatures in the range from 1250° to 1500° C. and preferably in the range from 1300° to 1450° C. with a holding time of from 0.5 to 100 h and preferably from 1 to 50 h.

The present invention also relates to a process for the production of ceramics according to the invention which is characterized in that it comprises the steps of mixing, shaping and sintering suitable materials.

To this end, a green body may be prepared in known manner from a slip. The shaping process may also be carried out by the compression molding of a powder mixture containing the usual temporary additives for the composition according to the invention. Other shaping techniques known to those skilled in the art may as well be employed. The use of a spray-dried granulate can be of advantage. Sintering is preferably carried out as reaction sintering under the sintering conditions mentioned above. Pre-reacted mixtures may of course also be used without any disadvantage.

After sintering, the ceramic may be machined in known manner.

The present invention also relates to the use of the sintered ceramics according to the invention.

They are particularly suitable for the production of hollow, tubular metal/ceramic composites. They are also suitable for the lining or supports of combustion chambers, pistons and cylinder heads. The ceramics according to the invention may also be used as catalyst supports, optionally after doping with catalytically active substances. By virtue of their favorable thermal and mechanical properties, the ceramics according to the invention are also suitable as materials in melt metallurgy.

The following Examples are intended to illustrate the invention without limiting it in any way.

EXAMPLES

The starting powders, mean particle size <2 μm, are mixed in accordance with the chemical compositions shown in Table I. The aqueous slip is dispersed in a drum mill with addition of the usual dispersants and binders. An open box is slipcast, the test bars measuring 50×5×3.5 mm being sawn therefrom after sintering. The particular sintering conditions and the resulting properties are shown in Table I. The crystalline phases after sintering were determined by X-ray diffractometry.

TABLE I

| | Example 1 | Example 2 | Example 3 | Example 4 |
|---|---|---|---|---|
| overall chemical composition [% by weight] | | | | |
| $Al_2O_3$ | 56.0 | 57.5 | 57.9 | 57.9 |
| $TiO_2$ | 39.1 | 37.2 | 36.1 | 36.1 |
| $SiO_2$ | 2.9 | 4.2 | 4.9 | 4.9 |
| $Fe_2O_3$ | 2.0 | 1.1 | 1.1 | 1.1 |
| Sintering conditions | 1375° C. 5 h | 1400° C. 15 h | 1375° C. 45 h | 1400° C. 15 h |
| Crystalline phases after sintering [% by weight] | | | | |
| $Al_{2-x}Fe_xTiO_5$ | 93 | 87 | 85 | 85 |
| Mullite | 7 | 13 | 15 | 15 |
| $Al_2O_3$ | <1 | <1 | <1 | <1 |
| $TiO_2$ | <1 | <1 | <1 | <1 |
| Properties | | | | |
| Sintered density [g/cm$^3$] | 3.11 | 3.07 | 3.06 | 3.07 |
| Flexural strength [MPa] | 52 | 41 | 44 | 48 |
| Young's modulus [GPa] | 19 | 16 | 18 | 20 |
| TEC (RT-1000° C.) [10$^{-6}$ 1/K] | 1.8 | 1.8 | 1.8 | 1.9 |

What is claimed is:

1. Sintered ceramics having principal phases of aluminum iron titanate and mullite with the overall chemical composition consisting of:
   50 to 62 parts by weight $Al_2O_3$,
   36 to 49.5 parts by weight of titanium oxide, expressed as $TiO_2$,
   0.5 to 5 parts by weight $SiO_2$, and with the sum of $Al_2O_3$, $TiO_2$ and $SiO_2$ being 100 parts, with
   0.4 to 5 parts by weight iron oxide, expressed as $Fe_2O_3$, and
   up to 1 parts by weight impurities, comprising at most 0.3% by weight of MgO
wherein the sum of crystalline phases of $Al_2O_3$, $TiO_2$, or $SiO_2$ or a mixture thereof, excluding the two principal phases of aluminum iron titante and mullite, is less than 6% by weight, based on the sintered body.

2. Sintered ceramics as claimed in claim 1 consisting of two crystalline phases which are an $Al_2TiO_5$-$Fe_2TiO_5$ solid solution and mullite expressed as 3 $Al_2O_3$.2 $SiO_2$.

3. Sintered ceramics as claimed in claim 1, characterized in that the sum of the crystalline phases $Al_2O_3$, $TiO_2$, $SiO_2$ other than the principal phases is less than 4% by weight, based on the sintered body.

4. Sintered ceramics as claimed in claim 1 wherein the sintered body is sintered at temperatures in the range from 1250° to 1500° C. for a holding time of 0.5 to 100 hour.

5. Sintered ceramics as claimed in claim 4 wherein the sintered body is sintered at temperatures from 1300° to 1450° C.

6. Sintered ceramics as claimed in claim 4 wherein the holding time is 1 to 50 hours.

7. Sintered ceramics as claimed in claim 4 wherein the sintered body is reaction-sintered.

8. A process for the production of the sintered ceramic claimed in claim 1 which comprises the steps of mixing the Al, Ti, Si and Fe containing raw materials, forming a shaped article from the mixture and sintering the article.

9. A process according to claim 8 wherein the mixture of the Al, Ti, Si and Fe containing raw materials is in the form of a slip.

10. A process according to claim 8 wherein forming the shaped article is by compression molding of a powder mixture of Al, Ti, Si and Fe containing raw materials.

11. A sintered ceramic as claimed in claim 1, wherein the $SiO_2$ is from 3.0 to 5 parts by weight.

12. A sintered ceramic as claimed in claim 1, wherein the $Fe_2O_3$ is from 1.1 to 2% by weight.

13. A sintered ceramic as claimed in claim 1, wherein the $TiO_2$ is from 37 to 49.5 parts by weight.

14. A sintered ceramic as claimed in claim 1, wherein the $TiO_2$ is from 39.9 to 49.5 parts by weight.

15. Sintered ceramics having principal phases of aluminum iron titanate and mullite with the overall chemical composition consisting of:
   50 to 62 parts by weight $Al_2O_3$,
   36 to 49.5 parts by weight of titanium oxide, expressed as $TiO_2$,
   0.5 to 5.5 parts by weight $SiO_2$, and with the sum of $Al_2O_3$, $TiO_2$ and $SiO_2$ being 100 parts, with
   0.4 to 5 parts by weight iron oxide, expressed as $Fe_2O_3$, and
   up to 1 parts by weight impurities, comprising at most 0.3% by weight of MgO
wherein the sum of crystalline phases of $Al_2O_3$, $TiO_2$, $SiO_2$ other than said principal phases is less than 6% by weight, based on the sintered body.

16. The sintered ceramics as claimed in claim 1, wherein said ceramics have a strength level of greater than or equal to 40 MPa.

* * * * *